(12) United States Patent
Chen et al.

(10) Patent No.: US 11,630,980 B2
(45) Date of Patent: Apr. 18, 2023

(54) COMBINED ULTRA-WIDEBAND CROSS-POLARIZED CHIPLESS RFID TAG BASED ON MFCC FEATURE CODING

(71) Applicant: ZHEJIANG UNIVERSITY, Zhejiang (CN)

(72) Inventors: Jiming Chen, Hangzhou (CN); Shibo He, Hangzhou (CN); Zhiguo Shi, Hangzhou (CN); Yuhao Chen, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/834,965

(22) Filed: Jun. 8, 2022

(65) Prior Publication Data
US 2022/0300782 A1 Sep. 22, 2022

Related U.S. Application Data

(63) Continuation of application No. PCT/CN2021/102901, filed on Jun. 29, 2021.

(30) Foreign Application Priority Data

Sep. 4, 2020 (CN) .......................... 202010923081.8

(51) Int. Cl.
*G06K 19/077* (2006.01)
*H01Q 1/22* (2006.01)

(52) U.S. Cl.
CPC ... *G06K 19/0772* (2013.01); *G06K 19/07773* (2013.01); *H01Q 1/2225* (2013.01)

(58) Field of Classification Search
CPC ......... G06K 19/0772; G06K 19/07773; H01Q 1/2225
(Continued)

(56) References Cited

U.S. PATENT DOCUMENTS

| 2007/0164121 A1* | 7/2007 | Tikhov | ............... G06K 19/0672 235/492 |
| 2009/0039158 A1* | 2/2009 | Grishin | ............... G06K 19/067 235/492 |

(Continued)

FOREIGN PATENT DOCUMENTS

| CN | 106295775 A | 1/2017 |
| CN | 107292371 A | 10/2017 |

(Continued)

OTHER PUBLICATIONS

International Search Report (PCT/CN2021/102901); dated Sep. 24, 2021.

(Continued)

*Primary Examiner* — Michael G Lee
*Assistant Examiner* — David Tardif
(74) *Attorney, Agent, or Firm* — W&G Law Group

(57) ABSTRACT

Discloses a combined ultra-wideband cross-polarized chipless RFID tag based on MFCC feature coding, which comprises a tag patch unit, a dielectric substrate and a grounding layer, wherein the tag patch unit comprises a barcode-type resonant unit and a double L-type resonant unit; the barcode-type resonant unit consists of five identical rectangular patches arranged in parallel and rotated counterclockwise; the double L-type resonant unit is formed by reversely combining two L-type patches composed of four identical rectangular patches; a transmitting antenna transmits horizontally polarized electromagnetic waves as interrogation signals, the scattered waves reflected by the tag are acquired by a receiving antenna, a receiver acquires the spectrum of the scattered waves to convert the spectrum into time domain signals by inverse Fourier transform, the response of the tag is extracted through a window, and
(Continued)

MFCC features are extracted by pre-emphasis and short-time Fourier transform.

10 Claims, 9 Drawing Sheets

(58) Field of Classification Search
USPC .......................................................... 235/492
See application file for complete search history.

(56) References Cited

U.S. PATENT DOCUMENTS

| | | | |
|---|---|---|---|
| 2012/0161931 A1* | 6/2012 | Karmakar | G01S 13/825 |
| | | | 235/492 |
| 2015/0122893 A1* | 5/2015 | Warth | G06K 19/14 |
| | | | 235/492 |
| 2017/0117607 A1 | 4/2017 | Louzir et al. | |
| 2021/0133403 A1* | 5/2021 | Martín Antolín | G06K 19/067 |

FOREIGN PATENT DOCUMENTS

| | | |
|---|---|---|
| CN | 108596313 A | 9/2018 |
| CN | 110659712 A | 1/2020 |
| CN | 111967563 A | 11/2020 |
| JP | 2008503759 A | 2/2008 |
| JP | 2019061516 A | 4/2019 |
| WO | 2013082665 A1 | 6/2013 |
| WO | 2019065665 A1 | 4/2019 |

OTHER PUBLICATIONS

CN First Office Action(202010923081.8); dated Jun. 3, 2021.
An L-shaped microstrip resonator loaded radio frequency identification chipless tag; Date of Mailing: Jan. 31, 2019.
A Compact Chipless RFID Tag Using Polarization Diversity for Encoding and Sensing; Date of Mailing: May 3, 2012.
JP Notice of Allowance(JP2022-515526); dated Nov. 9, 2022.

* cited by examiner

COMBINED ULTRA-WIDEBAND CROSS-POLARIZED CHIPLESS RFID TAG BASED ON MFCC FEATURE CODING

CROSS-REFERENCE TO RELATED APPLICATIONS

The present application is a continuation of International Application No. PCT/CN2021/102901, filed on Jun. 29, 2021, which claims priority to Chinese Application No. 202010923081.8, filed on Sep. 4, 2020, the contents of both of which are incorporated herein by reference in their entireties.

TECHNICAL FIELD

The present application relates to the field of chipless RFID, in particular to a combined ultra-wideband cross-polarized chipless RFID tag based on MFCC feature coding.

BACKGROUND

Radio frequency identification technology (RFID) involves use of radio frequency signals to detect and identify tags attached to the surface of an object. On the basis of inheriting the original function of a barcode, the RFID adds the functions of remote reading, batch reading and modifying the information contained in the tag. These advantages of the RFID make it have great development potential in such fields as logistics, tracking and access control. However, because traditional RFID requires RFID tags containing integrated circuit chips, and integrated circuit chips are expensive and difficult to be applied in large scale, it is a hot research direction of the RFID technology to design a low-cost chipless tag to remove integrated circuit chips. One of the design difficulties is how to design a radio frequency tag with a large coding capacity that can meet the needs of different actual scenes. At present, a frequency domain coding method is mainly used for RF tags with a large coding capacity to meet the needs of different actual scenes, because the application scenes of time domain coded RF tags are often limited by conveyor belt scenes. The frequency domain coding methods with a large coding capacity that are mainly studied at present include presence-absence coding, amplitude coding, offset coding and mixed coding, etc. However, when these coding methods are used in actual scenes, different degrees of coding failure will often occur in different frequency bands.

SUMMARY

In order to overcome the shortcomings of the prior art, the present application provides a combined ultra-wideband cross-polarized chipless RFID tag based on MFCC feature coding.

The purpose of the present application is realized by the following technical solution: a combined ultra-wideband cross-polarized chipless RFID tag based on MFCC feature coding, comprising a tag patch unit, a dielectric substrate and a grounding layer, wherein the tag patch unit is located on an upper surface of the dielectric substrate, and the grounding layer is located on a lower surface of the dielectric substrate;

the tag patch unit comprises six barcode-type resonant units and six double L-type resonant units;

the barcode-type resonant units consists of five identical rectangular patches arranged in parallel and rotated counterclockwise, the rectangular patches of different barcode-type resonant units have same width and interval and different lengths, the six barcode-type resonant units are arranged horizontally, and an interval between different barcode-type resonant units is the same;

the double L-type resonant unit is formed by reversely combining two L-type patches composed of four identical rectangular patches, the rectangular patches in different double L-type resonant units have a same width, different lengths and intervals, and the six double L-type resonant units are arranged horizontally, and an interval between different double L-type resonant units is the same;

a transmitting antenna TX transmits horizontally polarized electromagnetic waves as interrogation signals, and scattered waves of the signals reflected by a tag are acquired by a receiving antenna RX; a receiver acquires a spectrum of the scattered waves, and the spectrum is converted into time domain signals by inverse Fourier transform; first, pre-emphasis is carried out, and then a short-time Fourier transform is carried out with a time window of 20 ns and a window moving step of 10 ns, and then a 12-dimensional MFCC feature value of each frame is extracted; the tag realizes a MFCC feature coding mode of 2-8 GHz, and can realize a coding of 15 bits in total.

Furthermore, both the barcode-type resonant unit and the double L-type resonant unit are composed of several rectangular patches having a same width, and the length of the rectangular patches plays a decisive role for a resonant frequency point in that the longer the rectangular patches, the lower the resonant frequency.

Furthermore, a first row of tags has six barcode-type resonant units and a second row of the tags has six double L-type resonant units, and each row of the tags can realize the differentiation of 12-dimensional MFCC feature values of different tags by reducing the resonant units of different sizes.

Furthermore, the 12-dimensional MFCC feature values of different tags can be distinguished by changing a rotation angle of the barcode-type resonant units.

Furthermore, the barcode-type resonant units are horizontally arranged in a row according to a highest point, and the double L-type resonant units are horizontally arranged in a row according to a center point.

Furthermore, the size and rotation angle of each resonant unit generate a specific MFCC feature value.

Furthermore, a MFCC feature of the time domain signals of the scattered waves of the tag is extracted, and in a case where a machine precision allows, a change of the MFCC feature value caused by the presence or absence and a rotation change of the resonant unit is distinguished to realize coding.

Furthermore, the transmitting antenna TX plays a role of transmitting access electromagnetic waves, and the receiving antenna RX plays a role of detecting the scattered waves of the tag; a maximum working frequency of the transmitting antenna TX and the receiving antenna RX needs to be higher than 8 GHz.

Furthermore, different rows of the tags correspond to resonant units with different shapes, and resonant units with different sizes and a same shape can be added to each row of the tags to increase the number of bits for coding; for the barcode-type resonant units, the number of bits for coding can be increased by changing the rotation angle of the barcode-type resonant units.

Furthermore, the dielectric substrate is a rectangular plate of 140 mm×54 mm with a thickness of 0.2 mm and is made of a Rogers RO4003C material; the tag patch unit is etched from a metal plate with a thickness of 0.035 mm; a thickness of the grounding layer is 0.2 mm; a width of the rectangular patch is 2 mm.

The present application has the following beneficial effects:

(1) By taking advantage of the characteristics of a barcode-type resonant unit with a high quality factor in a low frequency band and not easily coupled by adjacent resonant units, and a double L-type resonant unit with a high quality factor in a high frequency band and not easily coupled by adjacent resonant units, six barcode-type resonant units with different resonant frequencies in a 2-5 GHz band and six double L-type resonant units with different resonant frequencies in a 5-8 GHz band are designed. This tag design is helpful to improve the spectrum utilization rate to obtain more different MFCC feature values.

(2) By using the RCS diagram of the scattered waves of the tag in the cross-polarization direction of incident waves, MFCC features are extracted, which avoids the interference of the noise in the co-polarization direction of the incident waves in the environment. Because theoretically the noise in the environment is polarized in the co-polarization direction of the incident waves, the tag design is helpful to improve the accuracy of the spectrum measured in the practical environment, so as to obtain more accurate MFCC features.

BRIEF DESCRIPTION OF DRAWINGS

FIG. 5(*b*) is a histogram of the 12-dimensional MFCC feature value of the first frame of the combined ultra-wideband cross-polarized chipless RFID tag according to the present application after one resonant unit is arbitrarily removed on the basis of FIG. 5(*a*);

FIG. 5(*c*) is a histogram of the 12-dimensional MFCC feature value of the first frame of a combined ultra-wideband cross-polarized chipless RFID tag according to the present application after arbitrarily removing two resonant units on the basis of FIG. 5(*a*);

FIG. 5(*d*) is a histogram of the 12-dimensional MFCC feature value of the first frame of a combined ultra-wideband cross-polarized chipless RFID tag according to the present application after changing the rotation angle of the barcode-type resonant unit to 15 degrees on the basis of FIG. 5(*a*);

DESCRIPTION OF EMBODIMENTS

The present application will be further described in detail below with reference to the examples and drawings, but the embodiments of the present application are not limited thereto.

EXAMPLES

Figure 1:
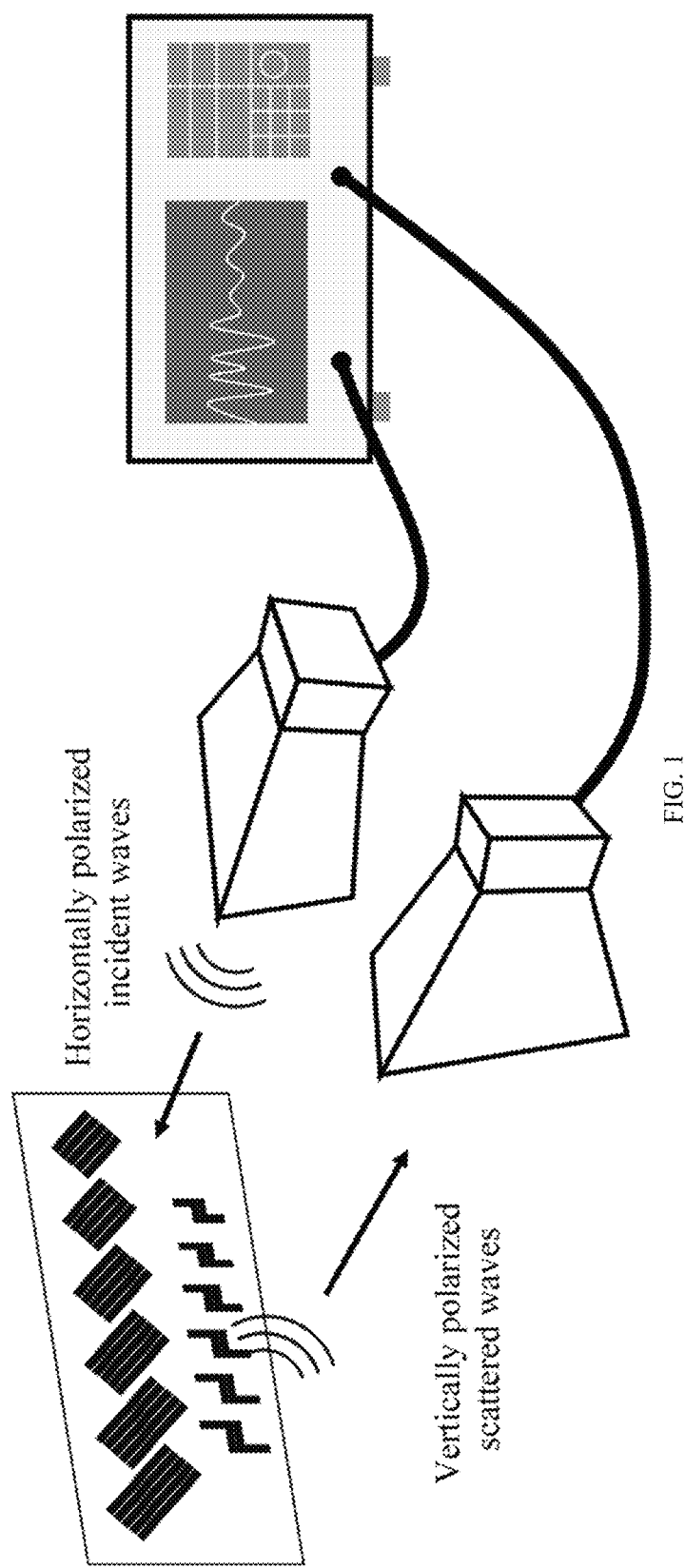
FIG. 1 is a structural diagram of the working system of a combined ultra-wideband cross-polarized chipless RFID tag according to the present application.

As shown in FIG. 1, a working system of a combined ultra-wideband cross-polarized chipless RFID tag based on MFCC feature coding consists of an RFID reader, a transmitting antenna TX, a receiving antenna RX and a tag. The transmitting antenna TX transmits horizontally polarized electromagnetic waves as interrogation signals, and the scattered waves reflected by the tag can be acquired by the receiving antenna RX in the vertical polarization direction, and a receiver acquires the spectrum of the scattered waves. The frequency spectrum is transformed into time domain signals by inverse Fourier transform. First, pre-emphasis is carried out, then short-time Fourier transform is carried out with a time window of 20 ns and a window moving step of 10 ns, and then 12-dimensional MFCC (Mel Frequency Cepstrum Coefficient) feature values of each frame are extracted. A 2-8 GHz MFCC feature coding mode is realized for the tag, and coding of 15 bits can be realized in total.

Figure 2:
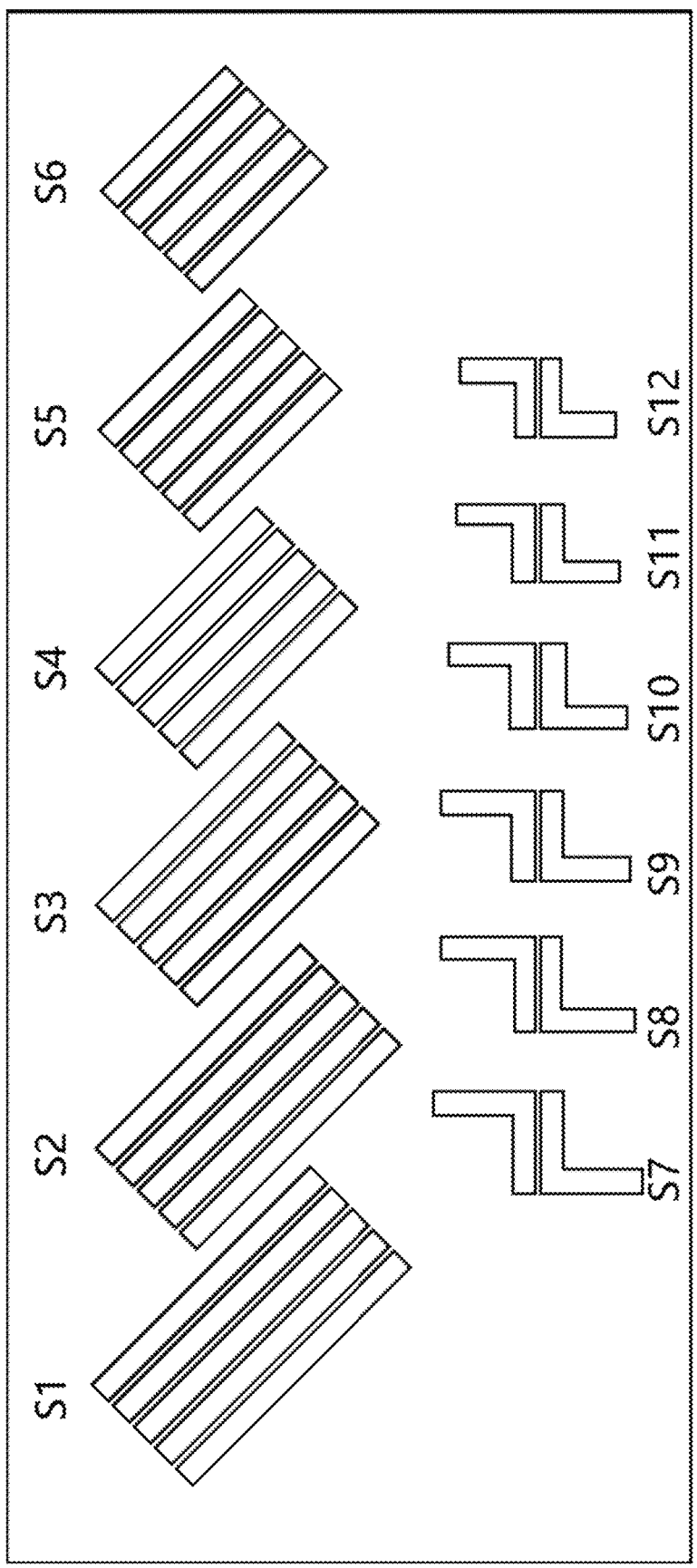
FIG. 2 is a top view of a combined ultra-wideband cross-polarized chipless RFID tag according to the present application.
Figure 3:
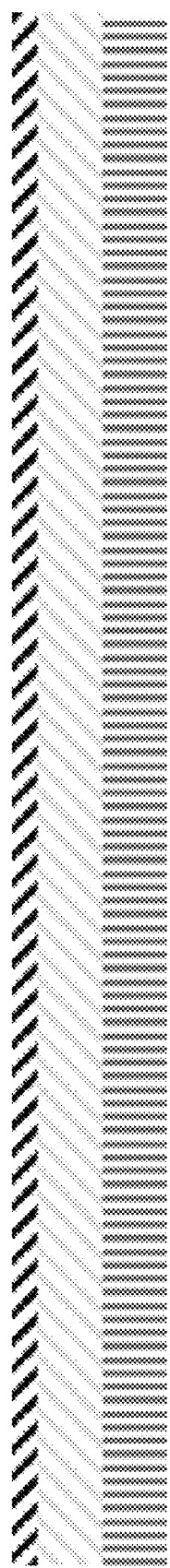
FIG. 3 is a side view of a combined ultra-wideband cross-polarized chipless RFID tag according to the present application.

As shown in FIG. 2 and FIG. 3, a combined ultra-wideband cross-polarized chipless RFID tag based on MFCC feature coding works in a 2-8 GHz band, including a tag patch unit, a dielectric substrate and a grounding layer. The tag patch unit is etched from a metal plate and located on the upper surface of the dielectric substrate; the grounding layer is located on the lower surface of the dielectric substrate.

The tag patch unit includes barcode-type resonant units and double L-type resonant units.

The barcode-type resonant units are made up of five identical rectangular patches arranged in parallel and rotated counterclockwise. As shown in FIG. 2, rectangular patches of different barcode-type resonant units have the same width and interval and different lengths, and six barcode-type resonant units are arranged horizontally with the same interval between different barcode-type resonant units.

The double L-type resonant unit consists of two reversely arranged L-type patches composed of four identical rectangular patches. As shown in FIG. 2, rectangular patches in different double L-type resonant units have the same width, different lengths and different intervals, and six double L-type resonant units are arranged horizontally, and the intervals between different double L-type resonant units are the same.

For both the barcode-type resonant unit and the double L-type resonant unit, the corresponding relationship between the parameters and the resonant frequency is that the longer the rectangular patch is, the lower the resonant frequency is. Based on the characteristics of the two shapes of resonant units, the tag uses six barcode-type resonant units (numbered S1 to S6 from left to right) with different sizes for MFCC feature coding in the frequency band of 2-5 GHz, and six double L-type resonant units (numbered S7 to S12 from left to right) with different sizes for MFCC feature coding in the frequency band of 5-8 GHz.

The number of bits that can be coded is calculated as follows: first, when the barcode-type resonant unit rotates at a specific angle, since each resonant unit has a different resonant frequency, the presence or absence of the corresponding resonant frequency peak in a RCS diagram is controlled by the presence or absence of 12 resonant units, and the features obtained are encoded with 12 bits after MFCC feature extraction. Secondly, the rotation angle of the barcode-type resonant unit includes 8 distinguishable states from 5 degrees to 45 degrees, with an interval of 5 degrees. That is, 3-bit rotation change coding is added to the 6-bit presence-absence change coding of barcode-type resonant unit, and a coding of 15 bits can be performed in total.

Figure 4:
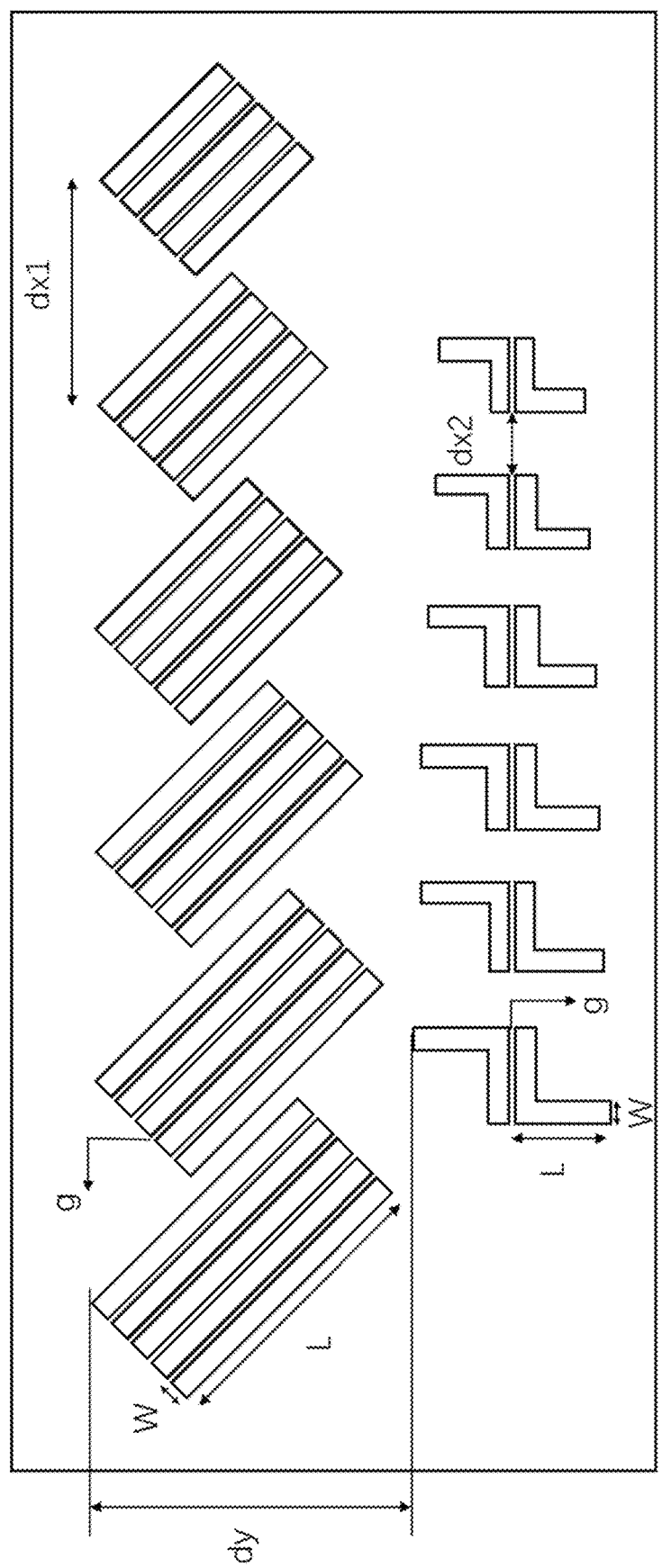
FIG. 4 is a schematic diagram of the parameters of a combined ultra-wideband cross-polarized chipless RFID tag in the embodiment of the present application.

The value of each parameter in this embodiment is as follows (see FIG. 4 for details):

| dx1 | dx2 | dy | w |
|---|---|---|---|
| 20 mm | 5 mm | 28 mm | 2 mm |

| | S1 | S2 | S3 | S4 | S5 | S6 | S7 | S8 | S9 | S10 | S11 | S12 |
|---|---|---|---|---|---|---|---|---|---|---|---|---|
| L(mm) | 25.7 | 24 | 21.8 | 19 | 16.8 | 15 | 8.6 | 8 | 7.5 | 7.1 | 6.75 | 6.5 |
| g(mm) | 0.5 | 0.5 | 0.5 | 0.5 | 0.5 | 0.5 | 0.39 | 0.36 | 0.34 | 0.32 | 0.31 | 0.31 |

In this embodiment, the dielectric substrate is made of a Rogers RO4003C material, with a relative dielectric constant of 3.55 and an electric loss tangent of 0.64. The dielectric substrate is a rectangular plate of 140 mm×54 mm with a thickness of 0.2 mm. The metal plate used is copper with a thickness of 0.035 mm. The grounding layer has a thickness of 0.2 mm.

Figure 5A:
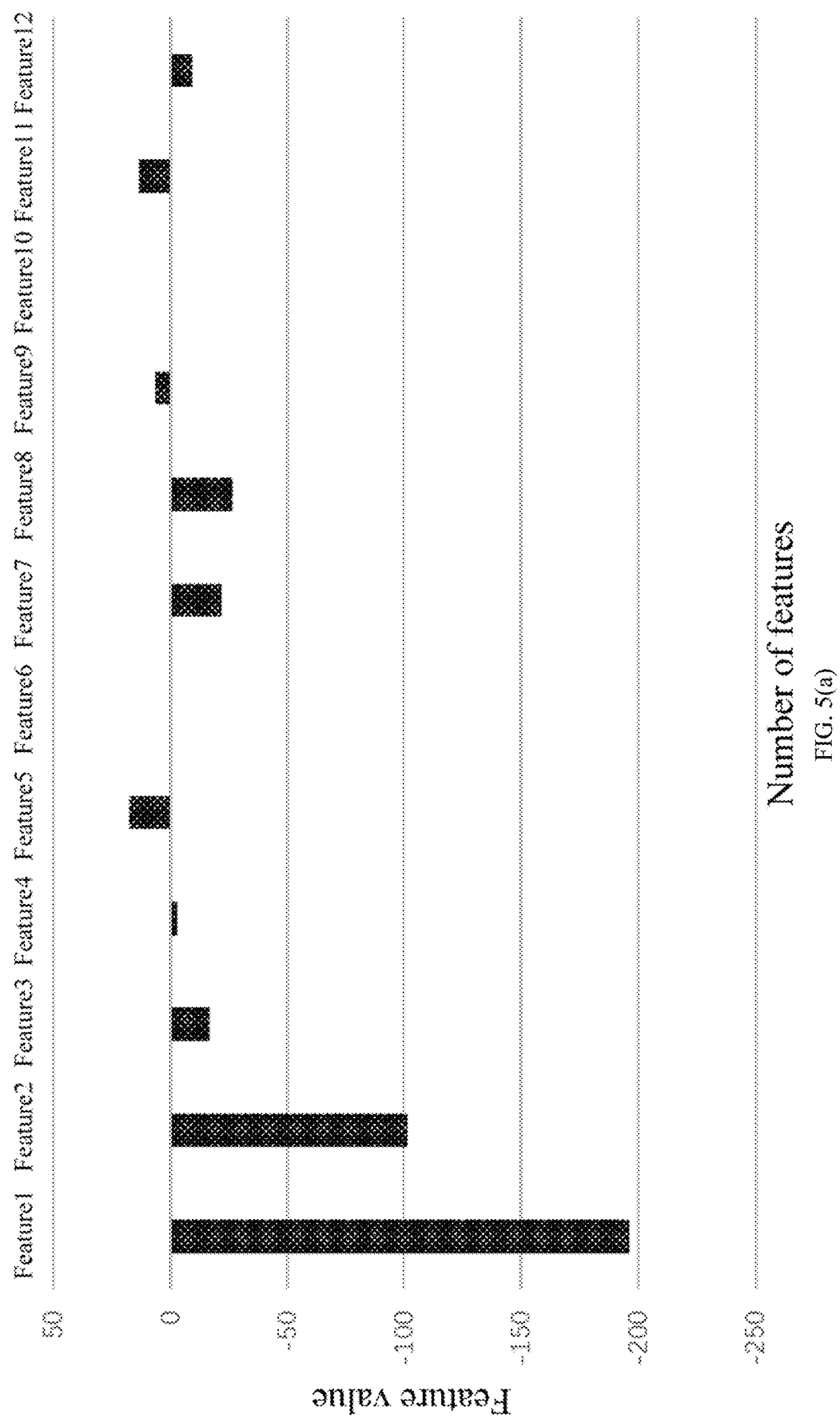
FIG. 5(*a*) is a histogram of the 12-dimensional MFCC feature value of the first frame in the cross polarization direction of a combined ultra-wideband cross polarization chipless RFID tag according to the present application.
Figure 5B:
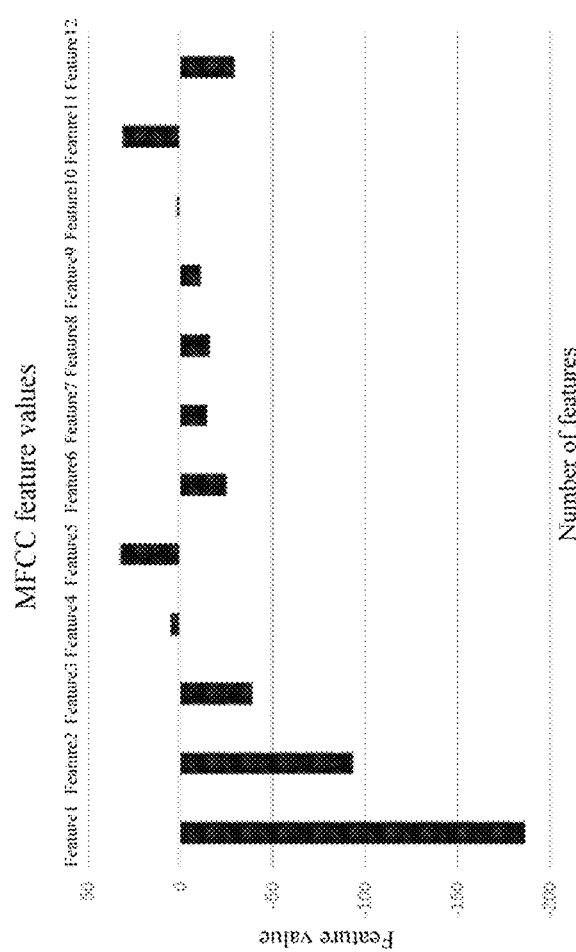
Figure 5B:
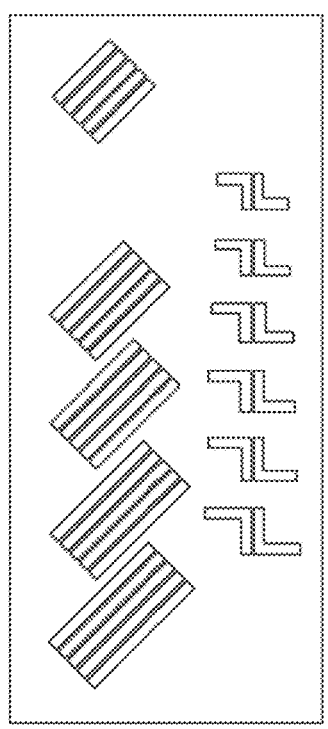
Figure 5C:
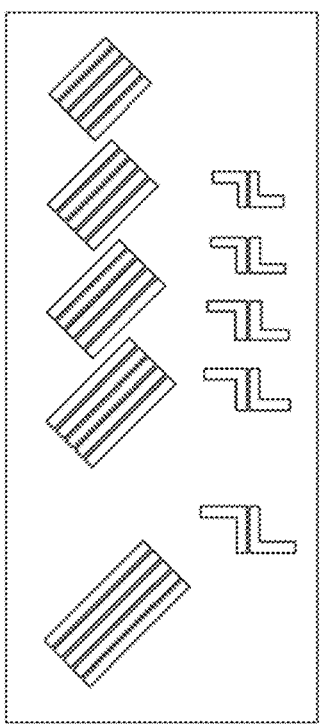
Figure 5C:
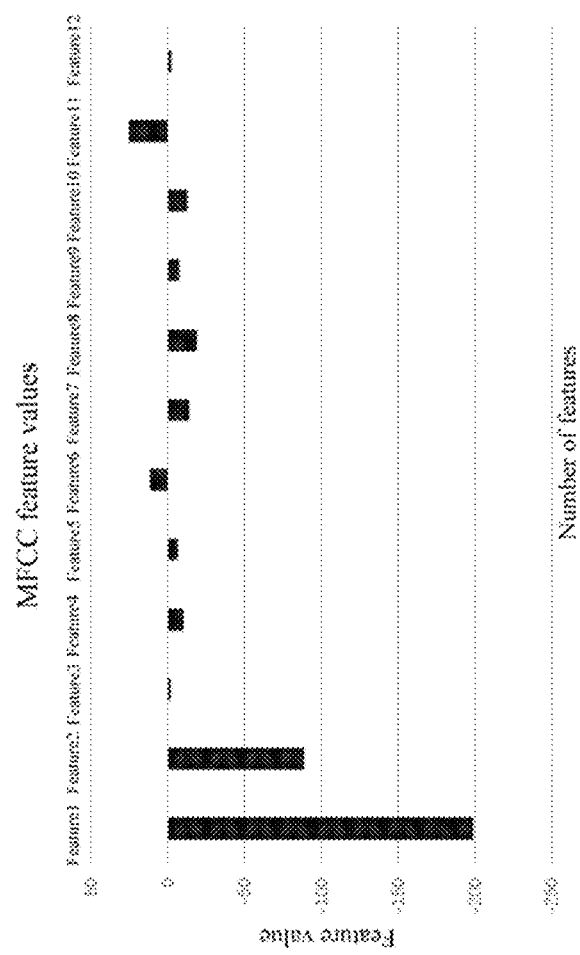
Figure 6:
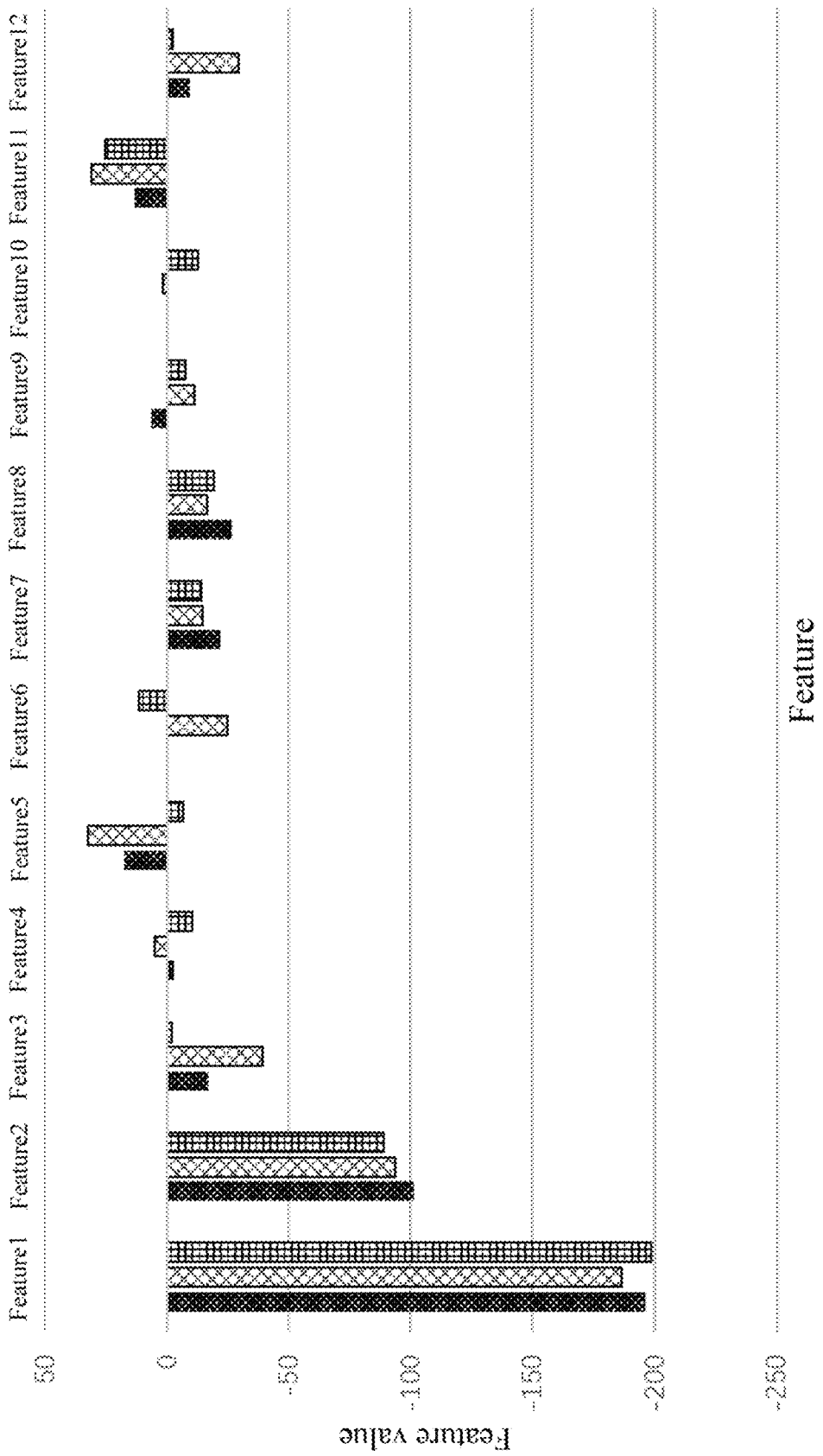
FIG. 6 is a comparison diagram of the 12-dimensional MFCC features of the first frames of three tags of FIGS. 5(*a*), 5(*b*) and 5(*c*)

FIG. 5(a), FIG. 5(b) and FIG. 5(c) are MFCC feature diagrams obtained by deleting 0, 1 and 2 resonant units respectively in a combined ultra-wideband cross-polarized chipless RFID tag based on MFCC feature coding when the rotation angle of the barcode-type resonant unit is 45 degrees according to the present application; FIG. 6 is a comparison diagram of MFCC features of three kinds of tags in FIGS. 5(a), 5(b) and 5(c). It can be seen from the figure that the 12-dimensional MFCC feature values of the three tags have obvious distinguishable numerical differences, for example, compared with FIG. 5(a), the value of feature 6 in FIG. 5(b) changes from 0 to negative, while the value of feature 6 in FIG. 5(c) changes from 0 to positive. Machine learning algorithms such as decision tree and support vector machine are used to train MFCC feature values, and finally different tags can be identified.

Figure 5D:
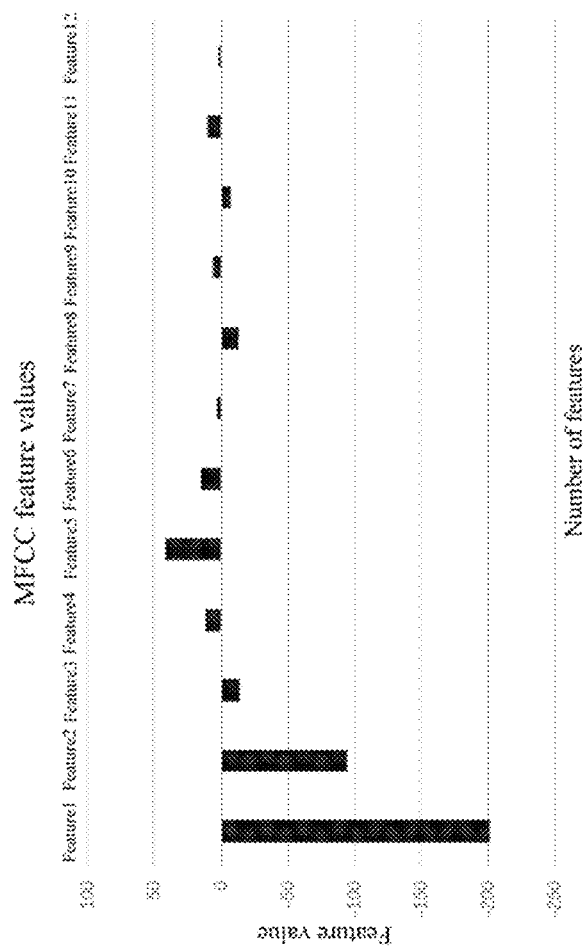
Figure 5D:
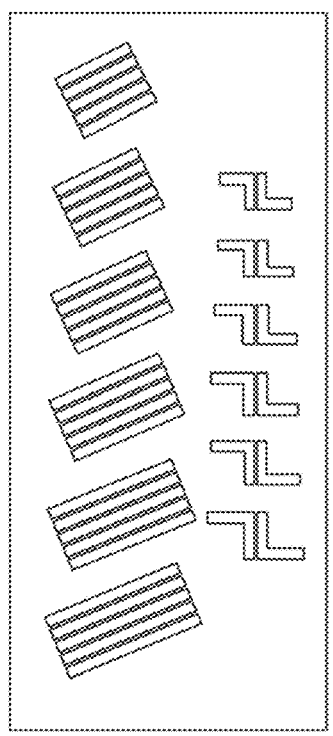
Figure 7:
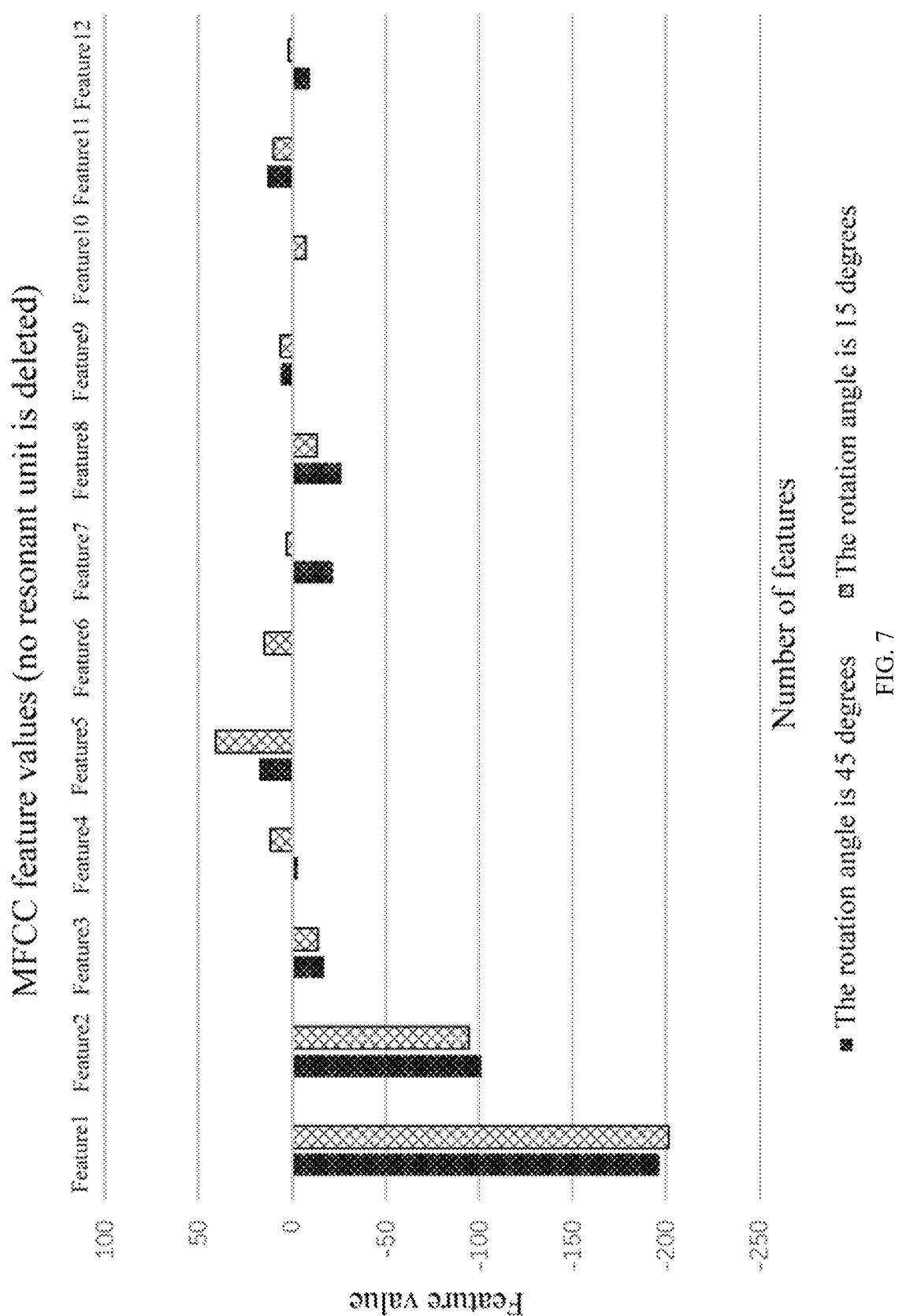
FIG. 7 is a comparison diagram of the 12-dimensional MFCC features of the first frames of the tags of FIGS. 5(*a*) and 5(*d*).

FIG. 5(a) and FIG. 5(d) are MFCC feature diagrams obtained when 0 resonant units are deleted in a combined ultra-wideband cross-polarized chipless RFID tag based on MFCC feature coding of the present application, and the rotation angles of the barcode-type resonant units are 45 degrees and 15 degrees; FIG. 7 is a comparison diagram of MFCC features of the two tags of FIGS. 5(a) and 5(d). It can be seen from the figure that there are obvious distinguishable numerical differences between the 12-dimensional MFCC feature values of the two tags. For example, compared with FIG. 5(a), the value of feature 4 in FIG. 5(d) changes from negative value to positive value. Machine learning algorithms such as decision tree and support vector machine are used to train MFCC feature values, and finally different tags can be identified.

The tag has the advantages of low cost, a large coding capacity and easy detection in actual environment.

The above embodiments are typical embodiments of the present application, but the embodiments of the present application are not limited thereto. Any other changes, modifications, substitutions, combinations and simplifications that do not deviate from the spirit and principle of the present application should be equivalent replacement methods, which are all included in the scope of protection of the present application.

What is claimed is:

1. A combined ultra-wideband cross-polarized chipless RFID tag based on MFCC feature coding, comprising a tag patch unit, a dielectric substrate and a grounding layer, wherein the tag patch unit is located on an upper surface of the dielectric substrate, and the grounding layer is located on a lower surface of the dielectric substrate;
   the tag patch unit comprises six barcode-type resonant units and six double L-type resonant units;
   the barcode-type resonant units consists of five identical rectangular patches arranged in parallel and rotated counterclockwise, the rectangular patches of different barcode-type resonant units have same width and interval and different lengths, the six barcode-type resonant units are arranged horizontally, and an interval between different barcode-type resonant units is the same;
   the double L-type resonant unit is formed by reversely combining two L-type patches composed of four identical rectangular patches, the rectangular patches in different double L-type resonant units have a same width, different lengths and intervals, and the six double L-type resonant units are arranged horizontally, and an interval between different double L-type resonant units is the same;
   a transmitting antenna TX transmits horizontally polarized electromagnetic waves as interrogation signals, and scattered waves of the signals reflected by a tag are acquired by a receiving antenna RX; a receiver acquires a spectrum of the scattered waves, and the spectrum is converted into time domain signals by inverse Fourier transform; first, pre-emphasis is carried out, and then a short-time Fourier transform is carried out with a time window of 20 ns and a window moving step of 10 ns, and then a 12-dimensional MFCC feature value of each frame is extracted; the tag realizes a MFCC feature coding mode of 2-8 GHz, and is capable of realizing a coding of 15 bits in total.

2. The combined ultra-wideband cross-polarized chipless RFID tag based on MFCC feature coding according to claim 1, wherein both the barcode-type resonant unit and the double L-type resonant unit are composed of several rectangular patches having a same width, and the length of the rectangular patches plays a decisive role for a resonant frequency point, the longer the rectangular patches, the lower the resonant frequency.

3. The combined ultra-wideband cross-polarized chipless RFID tag based on MFCC feature coding according to claim 1, wherein a first row of tags has six barcode-type resonant units and a second row of the tags has six double L-type resonant units, and each row of the tags is capable of realizing the differentiation of 12-dimensional MFCC feature values of different tags by reducing the resonant units of different sizes.

4. The combined ultra-wideband cross-polarized chipless RFID tag based on MFCC feature coding according to claim 1, wherein the 12-dimensional MFCC feature values of different tags can be distinguished by changing a rotation angle of the barcode-type resonant units.

5. The combined ultra-wideband cross-polarized chipless RFID tag based on MFCC feature coding according to claim 1, wherein the barcode-type resonant units are horizontally arranged in a row according to a highest point, and the double L-type resonant units are horizontally arranged in a row according to a center point.

6. The combined ultra-wideband cross-polarized chipless RFID tag based on MFCC feature coding according to claim 1, wherein the size and rotation angle of each resonant unit generate a specific MFCC feature value.

7. The combined ultra-wideband cross-polarized chipless RFID tag based on MFCC feature coding according to claim 1, wherein a MFCC feature of the time domain signals of the scattered waves of the tag is extracted, and in a case where a machine precision allows, a change of the MFCC feature value caused by the presence or absence and a rotation change of the resonant unit is distinguished to realize coding.

8. The combined ultra-wideband cross-polarized chipless RFID tag based on MFCC feature coding according to claim 1, wherein the transmitting antenna TX plays a role of transmitting access electromagnetic waves, and the receiving antenna RX plays a role of detecting the scattered waves of the tag; a maximum working frequency of the transmitting antenna TX and the receiving antenna RX needs to be higher than 8 GHz.

9. The combined ultra-wideband cross-polarized chipless RFID tag based on MFCC feature coding according to claim 1, wherein different rows of the tags correspond to resonant units with different shapes, and resonant units with different sizes and a same shape is capable of being added to each row of the tags to increase the number of bits for coding; for the barcode-type resonant units, the number of bits for coding is capable of being increased by changing the rotation angle of the barcode-type resonant units.

10. The combined ultra-wideband cross-polarized chipless RFID tag based on MFCC feature coding according to claim 1, wherein the dielectric substrate is a rectangular plate of 140 mm×54 mm with a thickness of 0.2 mm and is made of a Rogers RO4003C material; the tag patch unit is etched from a metal plate with a thickness of 0.035 mm; a thickness of the grounding layer is 0.2 mm; and a width of the rectangular patch is 2 mm.

\* \* \* \* \*